(12) United States Patent
Kurabayashi

(10) Patent No.: US 9,979,609 B2
(45) Date of Patent: May 22, 2018

(54) CLOUD PROCESS MANAGEMENT

(75) Inventor: Shuichi Kurabayashi, Kanagawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 204 days.

(21) Appl. No.: 13/809,012

(22) PCT Filed: Aug. 22, 2012

(86) PCT No.: PCT/US2012/051924
§ 371 (c)(1),
(2), (4) Date: Jan. 8, 2013

(87) PCT Pub. No.: WO2014/031115
PCT Pub. Date: Feb. 27, 2014

(65) Prior Publication Data
US 2014/0237108 A1 Aug. 21, 2014

(51) Int. Cl.
*H04L 29/06* (2006.01)
*H04L 12/24* (2006.01)
*G06F 9/50* (2006.01)

(52) U.S. Cl.
CPC .............. *H04L 41/24* (2013.01); *G06F 9/505* (2013.01); *G06F 2209/5021* (2013.01)

(58) Field of Classification Search
CPC ... H04L 29/08072; H04L 29/06; H04L 43/00; H04L 12/2602; H04L 41/22
See application file for complete search history.

(56) References Cited

U.S. PATENT DOCUMENTS

| | | | | |
|---|---|---|---|---|
| 6,424,993 B1* | 7/2002 | Weber | ................. | H04L 12/5695 709/203 |
| 2004/0268357 A1* | 12/2004 | Joy | ......................... | H04L 29/06 718/105 |
| 2006/0218243 A1* | 9/2006 | Kudo | ..................... | G06F 9/505 709/218 |
| 2008/0077928 A1 | 3/2008 | Matsuzaki et al. | | |
| 2011/0138055 A1* | 6/2011 | Daly | ...................... | G06F 9/505 709/226 |
| 2011/0153822 A1* | 6/2011 | Rajan | .................... | G06F 9/5055 709/225 |
| 2011/0154350 A1* | 6/2011 | Doyle | ................... | G06F 9/5044 718/104 |

(Continued)

OTHER PUBLICATIONS

Saravanakumar et al., "Traffic Analysis and Shaping of the Cloud Services over Common Deployment Model using Cloud Analysis" Apr. 2012, International Journal of Computer Applications, vol. 43, No. 4, pp. 33-37.*

(Continued)

*Primary Examiner* — Vivek Srivastava
*Assistant Examiner* — Hien Doan

(57) ABSTRACT

In some examples, a method for managing service requests to a cloud computing system is described. The method may include receiving a service response from a cloud computing system in reply to a service request generated by a process executed on a computing device. The method may also include extracting processing capacity information of the cloud computing system from the service response. The method may also include determining an execution priority for the process based at least in part on the processing capacity information.

14 Claims, 8 Drawing Sheets

(56) References Cited

U.S. PATENT DOCUMENTS

| | | |
|---|---|---|
| 2011/0173626 A1 | 7/2011 | Chi et al. |
| 2012/0072581 A1 | 3/2012 | Tung et al. |
| 2012/0123886 A1 | 5/2012 | Brown et al. |
| 2012/0246258 A1* | 9/2012 | Zhang .................. H04W 56/00 709/213 |

OTHER PUBLICATIONS

International Search Report & Written Opinion dated Oct. 23, 2012 for PCT/US2012/051924.
Saravanakumar et al., "Traffic Analysis and Shaping of the Cloud Services over Common Deployment Model using Cloud Analysis" International Journal of Computer Applications, vol. 43, No. 4, pp. 33-37, Apr. 2012.
ITU-T I.371 : Traffic control and congestion control in B-ISDN Section 7.2.7 defines and discusses Traffic Shaping in B-ISDN, pp. 90-91, Mar. 2004.
ARM the Architecture for the Digital World®, Cortex-A9 Processor, Cortex-A9 Processor, <http://www.arm.com/products/processors/cortex-a/cortex-a9.php>, from the internet on Jan. 8, 2013
ARM the Architecture for the Digital World®, Cortex-A15 Processor, <http://www.arm.com/products/processors/cortex-a/cortex-a15.php>, from the internet on Jan. 8, 2013
Openmobster—OpenMobster—Open Source Mobile Cloud Platform—Google Project Hosting, <code.google.com/p/openmobster/>, from the internet on Apr. 4, 2012.
OpenMobster—Mobile Cloud Platform App Developer Guide, Chapter 3—Programming Concepts, <openmobster.googlecode.com/files/master.pdf> from the internet on Jan. 8, 2013.

* cited by examiner

CLOUD PROCESS MANAGEMENT

CROSS-REFERENCE TO RELATED APPLICATION

This Application is the U.S. National Stage filing under 35 U.S.C. § 371 of International Application No. PCT/US2012/051924, filed on Aug. 22, 2012. International Application No. PCT/US2012/051924 is hereby incorporated by reference in its entirety.

BACKGROUND

Unless otherwise indicated herein, the materials described herein are not prior art to the claims in the present application and are not admitted to be prior art by inclusion in this section.

Cloud computing refers to the access of computing resources and data via a network infrastructure, such as the Internet. The computing resources may be provided by one or more servers that may also provide data storage and data retrieval capabilities. Users of cloud computing generally do not have knowledge regarding or control over the underlying data center infrastructure or the computing resources and deployment. Rather, the users may access the computing resources and data storage capabilities on an as-needed basis.

SUMMARY

Techniques described herein generally relate to managing service requests to a cloud computing system.

In some examples, a computing device configured to communicate with a cloud computing system is described. The computing device may include a cloud communication unit configured to receive a service response from a cloud computing system in reply to a service request generated by a process executed on the computing device. The computing device may also include an information extraction unit configured to extract processing capacity information of the cloud computing system from the service response. The computing device may also include a process management unit configured to determine an execution priority for the process based on the processing capacity information.

In some examples, a cloud computing system is described. The cloud computing system may include a device communication unit configured to receive a service request and to send a service response in reply to the service request. The cloud computing system may also include a capacity calculation unit configured to calculate processing capacity information of the cloud computing system, the processing capacity information may include an indication of an ability of the cloud computing system to reply to a future service request. The cloud computing system may also include an information embedding unit configured to include the processing capacity information of the cloud computing system in the service response.

In some examples, a method for managing service requests to a cloud computing system is described. The method may include receiving a service response from a cloud computing system in reply to a service request generated by a process executed on a computing device. The method may also include extracting processing capacity information of the cloud computing system from the service response. The method may also include determining an execution priority for the process based on the processing capacity information.

In some examples, a method for servicing service requests through a cloud computing system is described. The method may include receiving a service request. The method may also include processing the service request to generate a service response. The method may also include calculating processing capacity information based at least in part on the processing of the service request. The method may also include including the processing capacity information in the service response.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
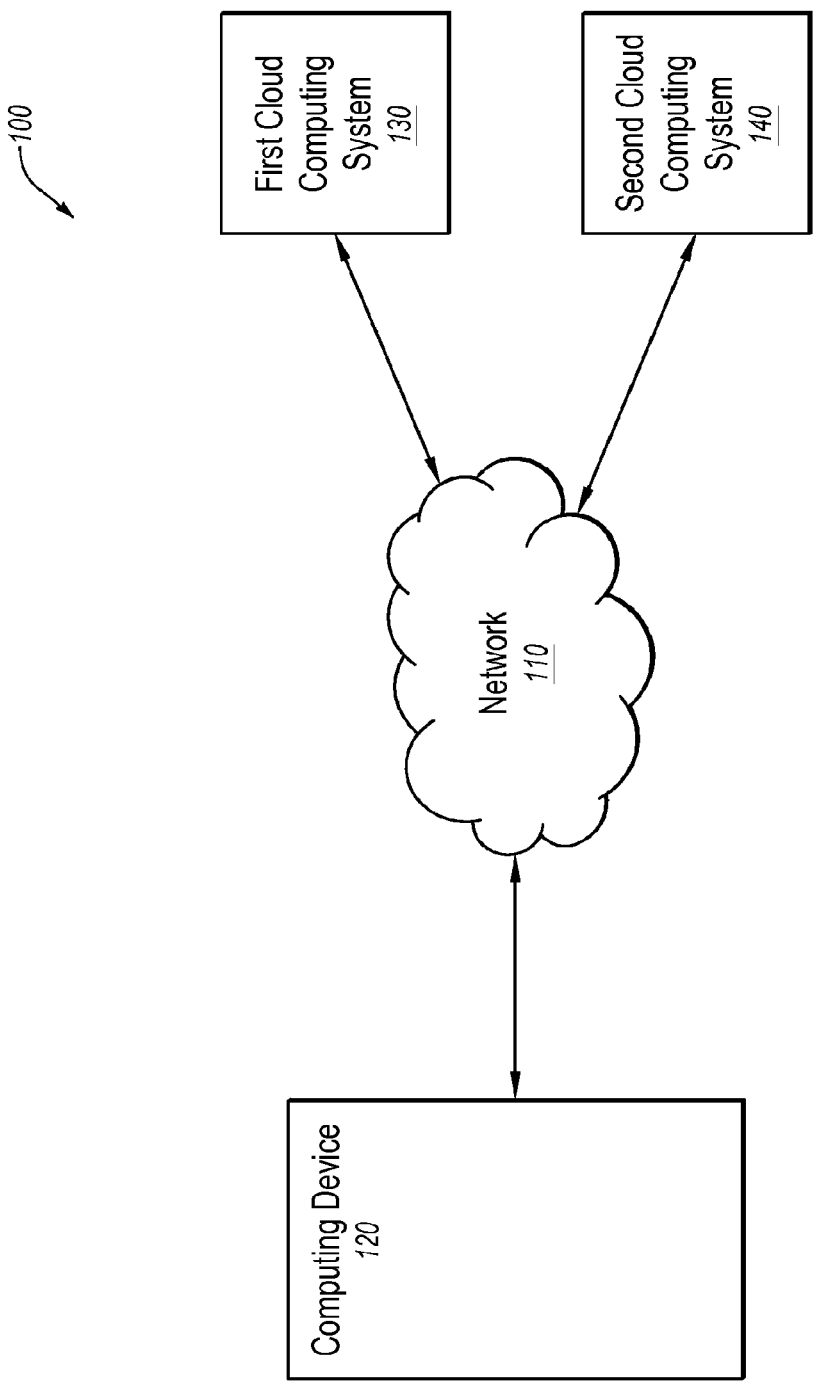
FIG. 1 is a block diagram of an example service request management system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some circumstances, a computing device and a cloud computing system may be configured to communicate with each other. The computing device may send a service request generated by a process executing on the computing device to the cloud computing system. In some embodiments, the service request may be an application programming interface call. The cloud computing system may receive the service request and process the service request to generate a service response. The cloud computing system may also calculate processing capacity information of the cloud computing system that may indicate an ability of the cloud computing system to reply to a future service request from the computing device. The cloud computing system may then send the service response with the processing capacity information to the computing device.

The computing device may receive the service response from the cloud computing system and may extract the processing capacity information from the service response. The computing device may then determine an execution priority for the process that generated the service request based at least in part on the processing capacity information received from the cloud computing system. In some embodiments, the processing capacity information may include a wait time interval indicating a time for the computing device to wait between sending future service requests that may be generated by the process that generated the service request to the cloud computing system. The computing device may delay execution of the process that generates the future service requests based on the wait time interval to increase the time between executions of the process. By increasing the time between executions of the process that results in the future service requests, the computing device may increase the time between the future service requests and thereby may reduce overloading the cloud computing system with service requests.

FIG. 1 is a block diagram of an example service request management system 100, arranged in accordance with at least some embodiments described herein. In the illustrated embodiment, the service request management system 100 may include a network 110, a computing device 120, a first cloud computing system 130, and a second cloud computing system 140. In other embodiments, the service request management system 100 may include fewer or more cloud computing systems than the illustrated first and second cloud computing systems 130 and 140. For example, the service request management system 100 may include 1, 3, 4, 5, 6, 10, 20, 30, or more cloud computing systems. The first and second cloud computing systems 130 and 140 are illustrated as examples only and the example service request management system 100 should not be limited to two cloud computing systems.

In general, the network 110 may include one or more wide area networks (WANs) and/or local area networks (LANs) that enable the computing device 120 and the first and second cloud computing systems 130 and 140 to communicate. In some embodiments, the network 110 may include the Internet, including a global internetwork formed by logical and physical connections between multiple WANs and/or LANs. Alternately or additionally, the network 110 may include one or more cellular RF networks and/or one or more wired and/or wireless networks such as, but not limited to, 802.xx networks, Bluetooth access points, wireless access points, IP-based networks, or the like. The network 110 may also include servers that enable one type of network to interface with another type of network.

For ease in explanation, the configuration, operation, and/or other aspects of the computing device 120 and general interactions that may occur between the computing device 120 and a cloud computing system within the service request management system 100 is now described as occurring between the computing device 120 and the first and second cloud computing systems 130 and 140. In particular, the following description describes the computing device's 120 general interactions with cloud computing systems with respect to the first cloud computing system 130. The following description should not be viewed as limiting the configuration, operation, and/or other aspects of the computing device 120 as being related to just the first cloud computing system 130. Rather, the interactions described herein between the computing device 120 and the first cloud computing system 130 may occur with any type of cloud computing system, such as the second cloud computing system 140 and others.

The computing device 120 may be configured to generate and to send service requests to the first cloud computing system 130 through the network 110. A service request may be generated by a process being executed on the computing device 120. For example, the computing device 120 may be executing a process such as an application that may generate the service request. The service request may include a request for the first cloud computing system 130 to provide data to the computing device 120. The data may be data stored on the first cloud computing system 130, data that is generated by the first cloud computing system 130 based on the service request, and/or data obtained by the first cloud computing system 130.

The first cloud computing system 130 may be configured to receive the service request from the computing device 120 and to generate a service response in reply to the service request. The service response may include the data requested by the service request. The first cloud computing system 130 may also be configured to send the service response to the computing device 120.

In some embodiments, the service request may be an application programming interface (API) call. For example, a process that generates the service request may be an application that provides social networking site information to a user of the computing device 110. In these and other embodiments, the first cloud computing system 130 may network with or otherwise be connected with the social networking site. The application may send the API call to the first cloud computing system 130. The API call may request various types of data, such as a person's social networking site status data, updated status data of friends of the user on the social networking site, or other information. The first cloud computing system 130 may execute the API call normally and may prepare a service response that includes the data generated and/or provided by executing the API call.

The first cloud computing system 130 may also be configured to generate processing capacity information of the first cloud computing system 130. The processing capacity information may include an indication of an ability of the first cloud computing system 130 to reply to future service requests from the computing device 120. In particular, the processing capacity information of the first cloud computing system 130 may include a wait time interval indicating a time for the computing device 120 to wait between sending future service requests to the first cloud computing system 130.

The processing capacity information may be generated by the first cloud computing system 130 based on a variety of information. For example, the information may include an average time for generating a service response for the computing device 120 and/or other computing devices, usage of the network 110, processing power usage of the first cloud computing system 130, data storage usage of the first cloud computing system 130, and a frequency of reception of service requests from the computing device 120 and/or other computing devices. In some embodiments, the processing capacity of the first cloud computing system 130 may be based at least in part on the receipt and processing of the service request from the computing device 120.

The first cloud computing system 130 may generate the processing capacity information at set intervals of time, such as every 15, 30, or 60 seconds, at random intervals of time, and/or at an occurrence of an event, such as the reception of a service request, generating a service response, or sending a service response.

The first cloud computing system 130 may embed the processing capacity information in the service response sent to the computing device 120. For example, the first cloud computing system 130 may embed the processing capacity information in a field designated within the service response for the processing capacity information. Alternately or additionally, the processing capacity information may be embedded within a field not designated for the processing capacity information, such as a hypertext transfer protocol (HTTP) header, an extensible markup language (XML) message comment, and/or a java script object notation (JSON) comment of the service response. In some embodiments, the first cloud computing system 130 may send the processing capacity information individually to the computing device 120.

The computing device 120 may be configured to extract the processing capacity information of the first cloud computing system 130 from the service response received from the first cloud computing system 130. After extracting the processing capacity information, the computing device 120 may determine an execution priority for the process that generated the service request based at least in part on the processing capacity information. Based on the execution priority, the computing device 120 may schedule a future execution of the process for a subsequent time after a previous time corresponding to the execution of the process that generated the service request. The subsequent time may occur after the previous time by a period greater than or equal to the wait time interval indicated in the processing capacity information. In some embodiments, the computing device 120 may schedule the future execution of the process to maintain a performance of the process. Thus, in these and other embodiments, the computing device may not schedule the future execution of the process so that the process does not meet its own timing constraints.

By having the first cloud computing system 130 provide the processing capacity information and the computing device 120 adjust the execution of the process that generates service requests sent to the first cloud computing system 130, the service request management system 100 may reduce overloading the first cloud computing system 130 with service requests. Furthermore, by having the computing device 120 adjusting when processes are executed, the applications or software used that describe the process may not need to be adjusted and/or modified to reduce overloading of the first cloud computing system 130 with service requests. Not adjusting and/or modified individual applications or software may provide backwards compatibility with existing applications or software and ease programming burdens for future applications or software.

In some embodiments, the computing device may include a mobile phone, a smart phone, a tablet computer, a laptop computer, a gaming console, or some other electronic device configured to execute processes.

Modifications, additions, or omissions may be made to FIG. 1 without departing from the scope of the present disclosure. For example, additional cloud computing systems may be added to the service request management system 100. Alternately or additionally, additional computing devices may be added to the service request management system 100 that access the first and second cloud computing systems 130 and 140.

Figure 2A:
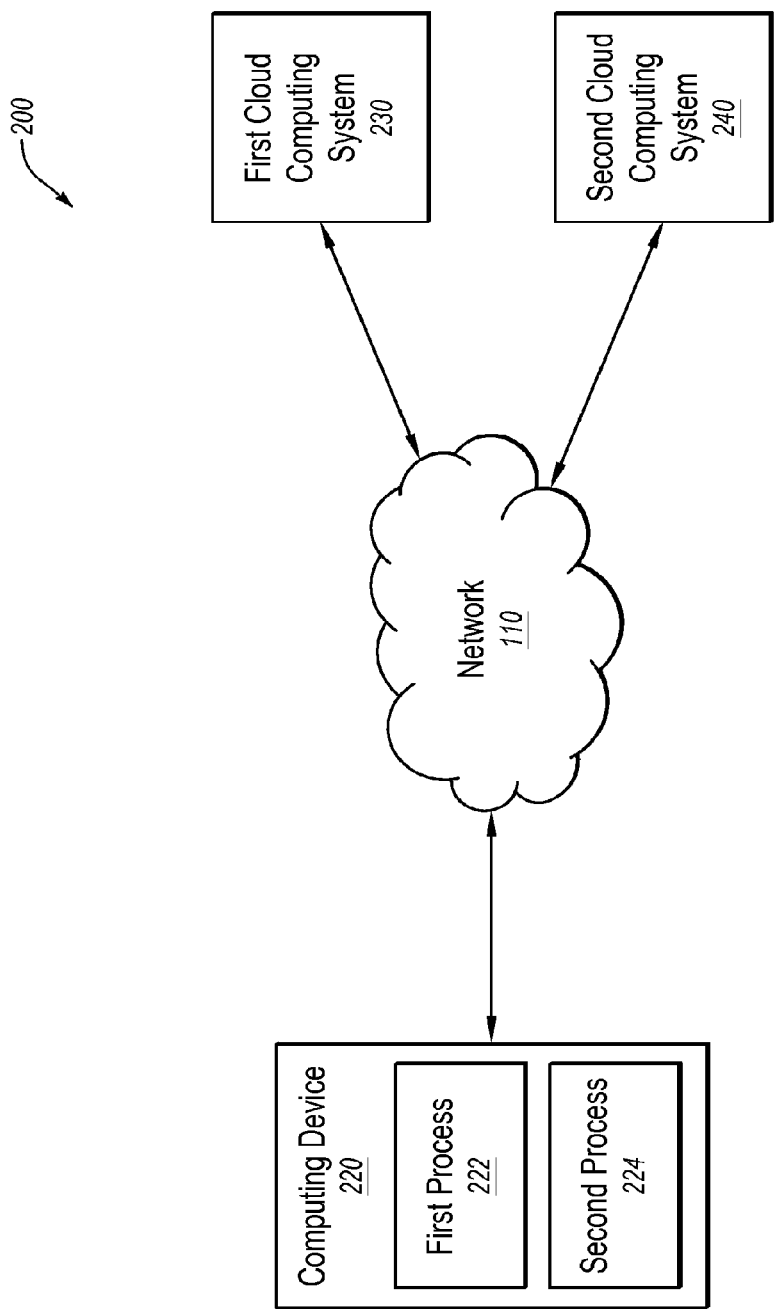
FIG. 2A is a block diagram of another example service request management system.

FIG. 2A is a block diagram of another example service request management system 200, arranged in accordance with at least some embodiments described herein. In the illustrated embodiment, the service request management system 200 may include the network 110, a computing device 220, a first cloud computing system 230, and a second cloud computing system 240.

Analogous to the network 110 of FIG. 1, the network 110 in the service request management system 200 of FIG. 2A may enable the computing device 220 and the first and second cloud computing systems 230 and 240 to communicate. The computing device 220, the first cloud computing system 230, and the second cloud computing system 240 may be similar to and/or correspond to the computing device 120, the first cloud computing system 130, and the second cloud computing system 140 of FIG. 1, respectively.

The computing device 220 may be configured to execute a first process 222 and a second process 224. The first process 222 may be configured to be executed by the computing device 220 to generate first process service requests. The first process service requests may be sent to the first cloud computing system 230. The second process 224 may be configured to be executed by the computing device 220 to generate second process service requests. The second process service requests may be sent to the second cloud computing system 240.

The first cloud computing system 230 and the second cloud computing system 240 may be configured to receive the first process service request and the second process service request, respectively, and to generate a first process service response and a second process service response, respectively. The first and second cloud computing systems 230 and 240 may also be configured to generate respective first and second processing capacity information for the first and second cloud computing systems 230 and 240.

The first cloud computing system 230 may embed the first processing capacity information in the first process service response and the second cloud computing system 240 may embed the second processing capacity information in the second process service response. The first and second cloud computing systems 230 and 240 may generate the respective first and second process service responses, the respective first and second processing capacity information, and may respectively embed the first and second processing capacity information in the respective first and second process service responses in a manner similar to the manner described with respect to FIGS. 1, 5, and/or 6.

The computing device 220 may be configured to receive the first process service response from the first cloud computing system 230 and to extract the first processing capacity information from the first process service response. The computing device 220 may also be configured to receive the second process service response from the second cloud computing system 240 and to extract the second processing capacity information from the second process service response.

The computing device 220 may use the first and second processing capacity information to determine a future execution priority for the first and second processes 222 and 224. In particular, the computing device 220 may schedule the future execution of the first and second processes 222 and 224 so that next executions of the first and second processes 222 and 224 adhere to the first and second processing capacity information received from the first and second cloud computing systems 230 and 240, respectively.

In some embodiments, the computing device 220 may delay the processing of the first and/or second processes 222 and 224. In these and other embodiments, the computing device 220, when delaying the processing of the first and/or second processes 222 and 224, may schedule other processes before the first and/or second processes 222 and 224. By executing processes based on the processing capacity information, the computing device 220 may execute processes that communicate with cloud processing systems with higher capabilities for receiving service requests more frequently than cloud processing systems with lower capabilities for receiving service requests. By communicating more frequently with higher capacity cloud processing systems, the computing device 220 may suppress overloading cloud computing systems with lower capabilities with service requests without degrading processing performance of the computing device 220.

Figure 2B:
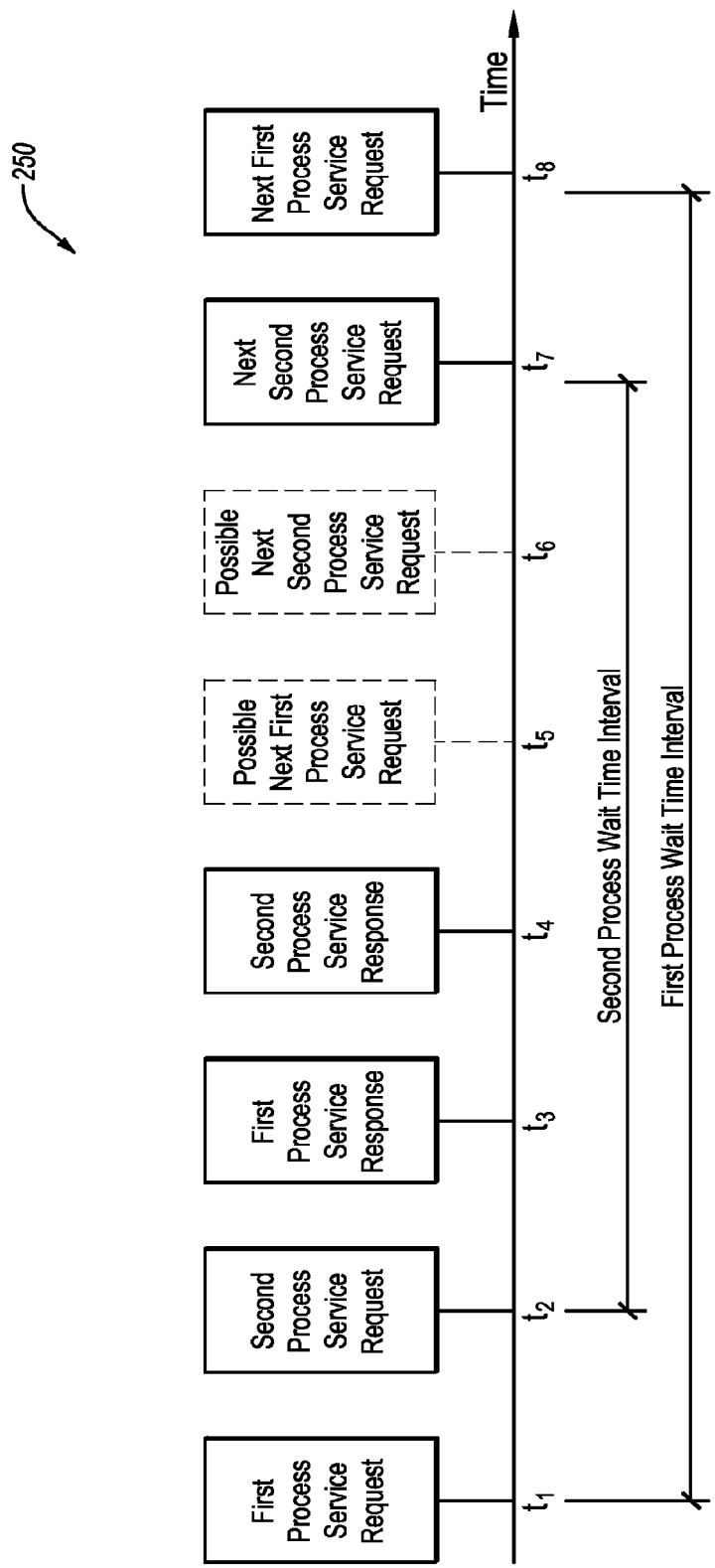
FIG. 2B illustrates an example timeline of service requests and service responses communicated within the service request management system of FIG. 2A.

FIG. 2B illustrates an example timeline 250 of service requests and service responses communicated within the service request management system 200 of FIG. 2A, arranged in accordance with at least some embodiments described herein. The timeline 250 is described with respect to both FIGS. 2A and 2B and illustrates timing for service requests and service responses being sent from and being received by the computing device 220. Various times are denoted along the timeline 250, including times $t_1$-$t_8$.

As illustrated, at $t_1$ a first process service request generated by the first process 222 may be sent from the computing device 220 to the first cloud computing system 230. The first cloud computing system 230 may receive the first process service request and may generate a first process service response. The first process service response may include first processing capacity information. The first process service response may be received by the computing device 220 at $t_3$.

At $t_2$ a second process service request generated by the second process 224 may be sent from the computing device 220 to the second cloud computing system 240. The second cloud computing system 240 may receive the second process service request and may generate a second process service response. The second process service response may include second processing capacity information. The second process service response may be received by the computing device 220 at $t_4$.

The timeline 250 further illustrates a first process wait time interval indicated by the first processing capacity information and a second process wait time interval indicated by the second processing capacity information. Based on the first and second process wait time intervals, the computing device 220 may schedule the execution of the first and second processes 222 and 224. Because the second process wait time interval is shorter than the first process wait time interval, the computing device 220 may schedule the second process 224 for execution based on the second process service request before execution of the first process 222 based on the first process service request. The second process wait time being shorter than the first process wait time may indicate that the second cloud computing system 240 may have greater current capabilities than the first cloud computing system 230 to handle service requests. The greater current capabilities of the second cloud computing system 240 may be due to the second cloud computing system 240 having better hardware, such as servers, than the first cloud computing system 230. Alternately or additionally, the greater current capabilities of the second cloud computing system 240 may be due to the second cloud computing system 240 currently receiving fewer service requests from other computing devices than the first cloud computing system 230.

At $t_7$ the computing device 220 may execute the second process 224 to generate a next second process service request that may be sent to the second cloud computing system 240. At $t_8$ the computing device 220 may execute the first process 222 to generate a next first process service request that may be sent to the first cloud computing system 230.

As illustrated in the timeline 250, the computing device 220 may be capable of executing the first process 222 to generate a possible next first process service request at $t_5$ in response to the first process service response received at $t_3$. Due to the first process wait time interval however, the computing device 220 may delay the execution of the first process 222 from time $t_5$ to $t_8$ as shown.

As illustrated in the timeline 250, the computing device 220 may also be capable of executing the second process 224 to generate a possible next second process service request at $t_6$ in response to the second process service response received at $t_4$. Due to the second process wait time interval however, the computing device 220 may delay the execution of the second process 224 from time $t_6$ to $t_7$ as shown.

As illustrated, the execution of the first process 222 to generate the next first process service request is delayed more than the execution of the second process 224 to generate the next second process service request. With the execution of the first process 222 delayed more than the execution of the second process 224, the computing device 220 schedules and executes the second process 224 in response to the second process service response before the execution of the first process 222 to generate the next first response service request.

The timeline 250 is illustrative of the execution of various processes in the service request management system 200 according to an example embodiment. Modifications, additions, or omissions may be made to FIG. 2B without departing from the scope of the present disclosure. For example, in some embodiments, the second process wait time interval may be longer than the first process wait time interval. In some embodiments, the first and/or second process wait time intervals may be shorter than the normal scheduling within the computing device 220 resulting in no delays in the execution of the first and/or second processes. Alternately or additionally, three or more processes may be scheduled with various associated wait time intervals. Alternately or additionally, other process performed by the computing device 220 not related to the first and second processes service 222 and 224 may be executed during a delay of the execution of either the first and/or second process 222 and 224. For example, processes related to managing memory, an operating system, external peripherals, other inputs/outputs, and other processes of the computing device 220 may be executed during the delay of the execution of either the first and/or second process 222 and 224.

Figure 3:
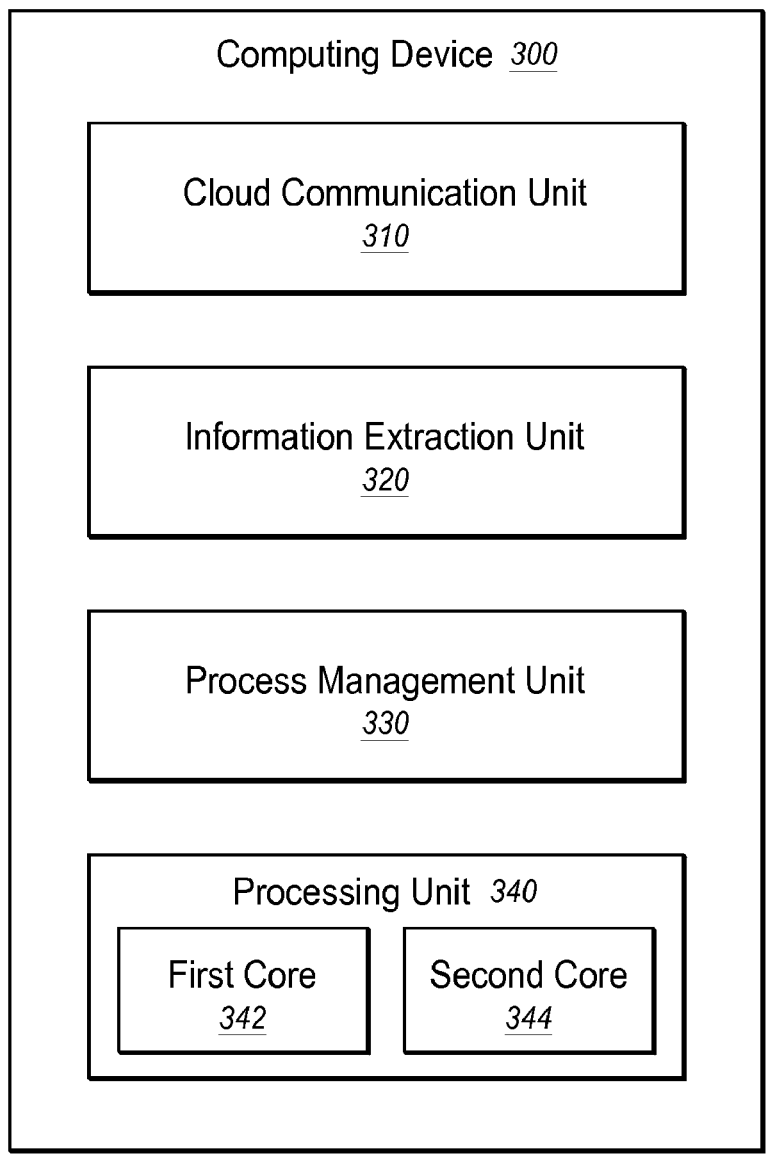
FIG. 3 is a block diagram of an example computing device that may be implemented in the example service request management systems of FIGS. 1 and 2A.

FIG. 3 is a block diagram of an example computing device 300 that may be implemented in the service request management systems 100, 200 of FIGS. 1 and 2A, arranged in accordance with at least some embodiments described herein. As illustrated, the computing device 300 may include a cloud communication unit 310, an information extraction unit 320, a process management unit 330, and a processing unit 340.

The cloud communication unit 310 may be configured to send service requests generated by the computing device 300 to a cloud computing system and to receive service response from a cloud computing system. The cloud communication unit 310 may be further configured to send service responses received from a cloud computing system to the information extraction unit 320 and/or the processing unit 340.

In some embodiments, the cloud communication unit 310 may communicate with multiple cloud computing systems. In these and other embodiments, the cloud communication unit 310 may handle protocols to send service requests and receive service responses over a network. For example, the cloud communication unit 310 may handle protocols for wirelessly sending service requests and wirelessly receiving service responses over a wireless network, such as, an 802.XX network, a Bluetooth network, a cellular data network, or some other radio communication network.

The cloud communication unit 310 may receive service requests from the processing unit 340 to send to cloud computing systems. In some embodiments, the cloud communication unit 310 may send service requests as soon as the cloud communication unit 310 receives service requests from the processing unit 340 or some other unit within the computing device 300. In these and other embodiments, the cloud communication unit 310 may have a queue of service requests and may send the service requests following a first-in first-out algorithm. In some circumstances, the service requests may be delayed being sent because of a backlog of service requests at the cloud communication unit 310. However, the cloud communication unit 310 may send the service requests as soon as possible based on the queue. In other embodiments, the cloud communication unit 310 may not send service requests as soon as they are received at the cloud communication unit 310. In these and other embodiments, the cloud communication unit 310 may delay sending service requests to perform network traffic shaping. Alternately or additionally, the cloud communication unit 310 may follow some other algorithm or procedure for sending service requests.

The information extraction unit 320 may be configured to receive service responses from the cloud communication unit 310 and to extract processing capacity information from the service responses. In some embodiments, a cloud computing system may not alter a format of a service response to create a field for processing capacity information embedded in the service response. In these and other embodiments, the cloud processing unit may embed the processing capacity information in other fields. The information extraction unit 320 may be configured to extract the processing capacity information from these other fields. For example, the information extraction unit 320 may extract the processing capacity information from a hypertext transfer protocol header, an extensible markup language message comment, and/or a java script object notation comment of the service response.

Embedding the processing capacity information in another field may have various advantageous. For example, processes executed by the computing device 300 that generate service requests and receive service responses may not have to handle another field within the service responses. Not having to handle another field may provide backwards compatibility with existing processes and ease programming burdens for future processes.

In some embodiments, the information extraction unit 320 may extract the processing capacity information from a field that is designated for the processing capacity information within a service response.

After extracting the processing capacity information, the information extraction unit 320 may send the processing capacity information to the process management unit 330.

The process management unit 330 may be configured to determine an execution priority (i.e. a schedule) for processes executing on the computing device 300 and to indicate to the processing unit 340 which process of the processes to execute at any given time.

The process management unit 330 may determine the execution priority for the processes based on various factors, such as the priority of the processes; the real time limitations of the processes, which is how often the processes may be executed and still meet the timing requirements for the processes; among other factors. The process management unit 330 may also consider processing capacity information of processes when determining execution priorities for those processes. Using processing capacity information for a process, the process management unit 330 may schedule the process based on how the process may affect a cloud computing system that receives service requests from and sends service responses to the process. Based on the processing capacity information, the process management unit 330 may adjust the priority of various processes. Adjusting the priority of various processes may delay the execution of some processes. In some embodiments, the process management unit 330 may not delay a process longer than an execution window for a process to avoid reducing the responsiveness of the process. Alternately or additionally, the process management unit 330 may delay a process irrespective of processing requirements of the process.

The processing unit 340 may include various cores, such as first and second cores 342 and 344. The processing unit 340 may be configured to receive an indication of a process to execute from the process management unit 330 and to execute the process. The processing unit 340 may be configured to execute multiple processes at the same time using the various cores within the processing unit 340. For example, the first and second cores 342 and 344 may each execute a process individually during the same time period.

An executed process may generate a service request for a cloud computing system. The processing unit 340 may send the service request to the cloud communication unit 310 for sending to the cloud computing system. In some embodiments, the service request may be an API call. For example, a process when executed may indicate data and/or data processing from a cloud computing system is a step in the process. The process may generate an API call that may be sent to the cloud computing system to obtain the data and/or data processing.

Modifications, additions, or omissions may be made to the computing device 300 without departing from the scope of the present disclosure. For example, the computing device 300 may include a memory unit for storing the processes executed on the computing device 300. The computing device 300 may also include a user interface for receiving data from and presenting data to a user of the computing device.

Figure 4:
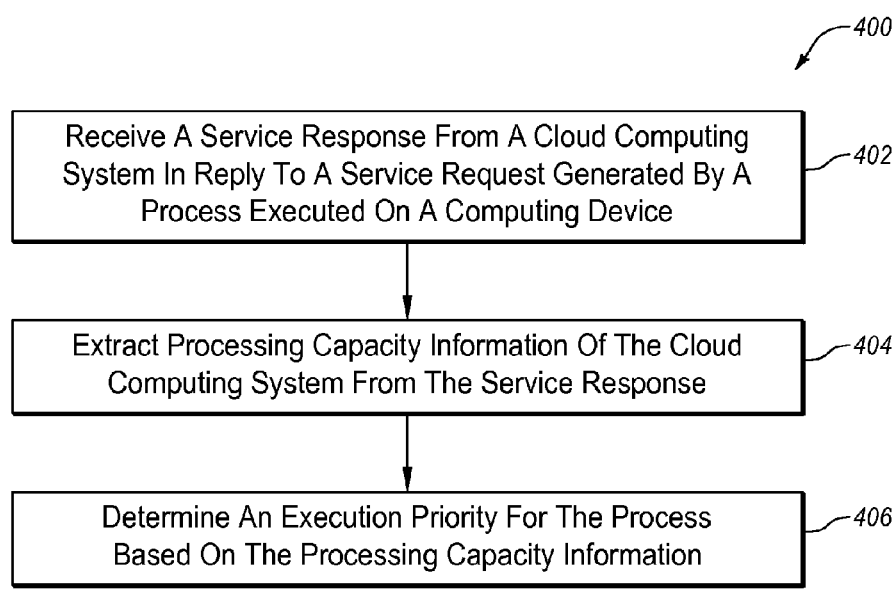
FIG. 4 illustrates an example flow diagram of a method that may be implemented in the example computing device of FIG. 3.

FIG. 4 illustrates an example flow diagram of a method 400 that may be implemented in the example computing device 300 of FIG. 3, arranged in accordance with at least some embodiments described herein. The method 400 includes various operations, functions, or actions as illustrated by one or more of blocks 402, 404, and/or 406. The method 400 may begin at block 402.

In block 402 [Receiver A Service Response From A Cloud Computing System In Reply To A Service Request Generated By A Process Executed On A Computing Device], a service response from a cloud computing system may be received in reply to a service request generated by a process executed on a computing device. The computing device may be the computing device 120, 220, and/or 320 of FIGS. 1, 2A and 3, respectively, for instance. In some embodiments, the service request may be an application programming interface call. Alternately or additionally, the service request may be received over a wireless network. Block 402 may be followed by block 404.

In block 404 [Extract Processing Capacity Information Of The Cloud Computing System From The Service Response], processing capacity information of the cloud computing system may be extracted from the service response. In some embodiments, the processing capacity information may include an indication of an ability of the cloud computing system to reply to a future service request. Alternately or additionally, the processing capacity information may include a wait time interval indicating a time to wait between sending future service requests to the cloud computing system. Block 404 may be followed by block 406.

In block 406 [Determine An Execution Priority For The Process Based On The Processing Capacity Information], an execution priority for the process based at least in part on the processing capacity information may be determined. In some embodiments, the execution priority may delay the execution of the process. Alternately or additionally, the execution priority may raise or lower the priority of the process for execution.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 may further include executing the process to generate the service request. Alternately or additionally, the method 400 may include scheduling a future execution of the process for a subsequent time after a previous time corresponding to the executing the process to generate the service request, the subsequent time occurring after the previous time by a period greater than or equal to the wait time interval.

An example of the method 400 is as follows, a computing device, such as a smart phone, may execute an email application that may generate a service request in the form of an API call regarding the status of an associated email system's inbox. The smart phone may send the API call over a wireless network to an email cloud computing system. The smart phone may receive a service response from the email cloud computing system in the form of an API response indicating that the email system inbox contains new emails. The service response may also indicate that the email cloud computing system requests a 15 millisecond wait time between service requests. The smart phone may not execute the email process immediately to avoid generating a service request to download the emails in the inbox. The smart phone may schedule other processes before the email process. For example, the smart phone may schedule a social networking site process before scheduling the email process. The smart phone may schedule the email process in such a manner so that the email process executes after the 15 millisecond wait time and thus sends the service request to the email cloud computing system with at least the 15 millisecond wait time between service requests. In this manner, the smart phone may reduce overloading the email cloud computing system with service requests while not degrading the performance of the smart phone.

Figure 5:
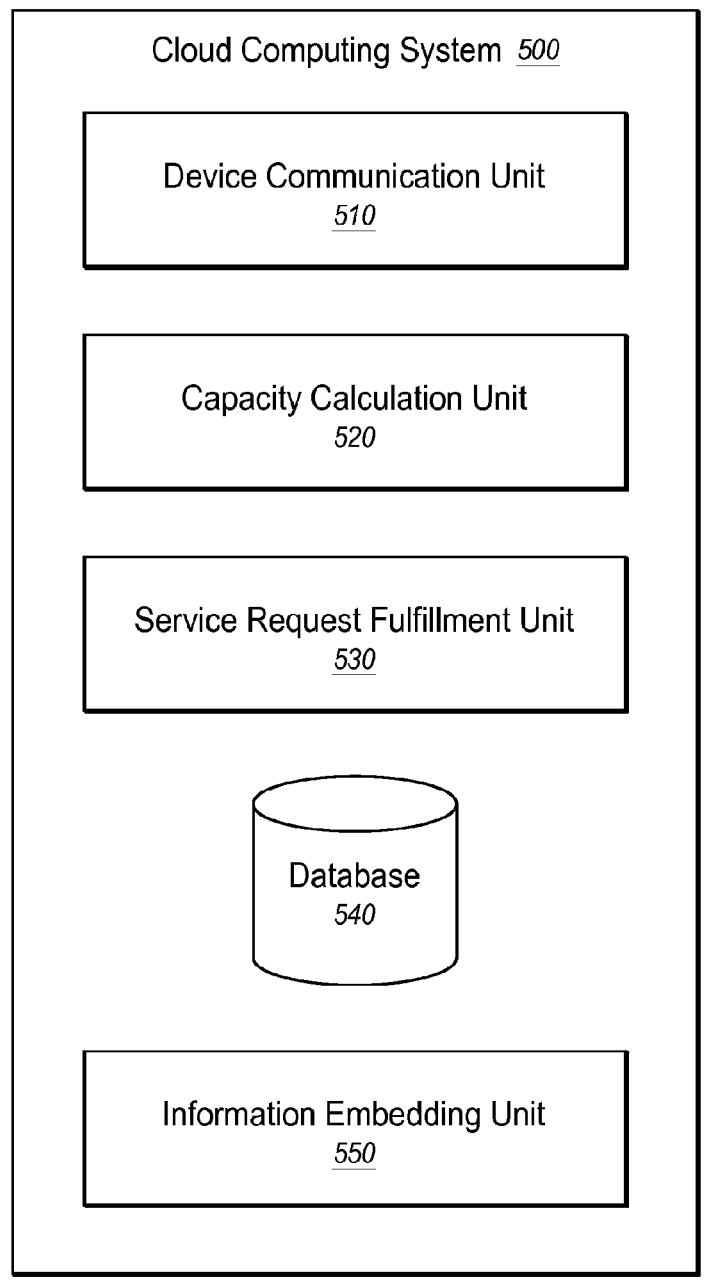
FIG. 5 is a block diagram of an example cloud computing system that may be implemented in the example service request management systems of FIGS. 1 and 2A.

FIG. 5 is a block diagram of an example cloud computing system 500 that may be implemented in the example service request management system 100, 200 of FIGS. 1 and 2A, arranged in accordance with at least some embodiments described herein. As illustrated, the cloud computing system 500 may include a device communication unit 510, a capacity calculation unit 520, a service request fulfillment unit 530, a database 540, and an information embedding unit 550.

The device communication unit 510 may be configured to receive service requests generated by a computing device, such as the computing device 120 and/or 300 of FIGS. 1 and 3, respectively. The device communication unit 510 may also be configured to send service responses to the computing device. In some embodiments, the device communication unit 510 may communicate with multiple computing devices. In these and other embodiments, the device communication unit 510 may handle protocols to receive service requests and to send service responses over a network. For example, the device communication unit 510 may handle protocols for wirelessly receiving service request and wirelessly sending service responses over a wireless network, such as 802.XX network, a Bluetooth network, a cellular data network, or some other radio communication network. The device communication unit 510 may be further configured to send service requests received from computing devices to the service request fulfillment unit 530.

The capacity calculation unit 520 may be configured to calculate processing capacity information of the cloud computing system 500. The processing capacity information may include an indication of an ability of the cloud computing system 500 to receive and/or reply to service requests from multiple computing devices.

The capacity calculation unit 520 may calculate the processing capacity information based on multiple factors that may include, but are not limited to, an average time for the cloud computing system 500 to generate service responses, usage of a network over which the cloud computing system 500 communicates, processing power usage of the cloud computing system 500, data storage usage of the cloud computing system 500, and a frequency of reception of service requests at the cloud computing system 500.

In some embodiments, the processing capacity information may include a wait time interval that may indicate a minimum time between requests that the cloud computing system 500 may receive from a single computing device without degrading a processing ability of the cloud computing system 500.

The service request fulfillment unit 530 may be configured to receive the service request from the device communication unit 510. The service request fulfillment unit 530 may be further configured to generate a service response based on the service request. For example, the service request may include a request for data. The service response may query the database 540 for the data and place the data in the service response. As another example, the service request may include a request of a status update for a social networking site feed, an email inbox, a blogging feed, a micro blogging feed, or some other status indicator. The service request fulfillment unit 530 may determine the status and indicate the status in the service response. As another example, the service request may request new emails in an inbox of an email service. The service request fulfillment unit 530 may generate a service response that contains the new emails. In some embodiments, the service request fulfillment unit 530 may include a server or multiple servers. After generating the service response, the service request fulfillment unit 530 may send the service response to the information embedding unit 550.

The information embedding unit 550 may be configured to receive the service response from the service request fulfillment unit 530 and to receive the processing capacity information from the capacity calculation unit 520. The information embedding unit 550 may be further configured to embed the processing capacity information into the service response.

In some embodiments, the information embedding unit 550 may not alter a format of the service response to embed the processing capacity information in the service response. In these and other embodiments, the information embedding unit 550 may embed the processing capacity information in fields within the service response designated for other purposes other than to carry processing capacity information. For example, the information embedding unit 550 may embed the processing capacity information in a hypertext transfer protocol header, an extensible markup language message comment, and/or a java script object notation comment of the service response.

Alternately or additionally, the information embedding unit 550 may embed the processing capacity information in a field designated for the processing capacity information in the service response. The designated field may include a field used for the processing capacity information and no other information. After embedding the processing capacity information in the service response, the information embedding unit 550 may send the service response to the device communication unit 510 so that the service response may be sent to a computing device.

Modifications, additions, or omissions may be made to the cloud computing system 500 without departing from the scope of the present disclosure. For example, the cloud computing system 500 may include a processor for processing data based on a service request from a computing device.

Figure 6:
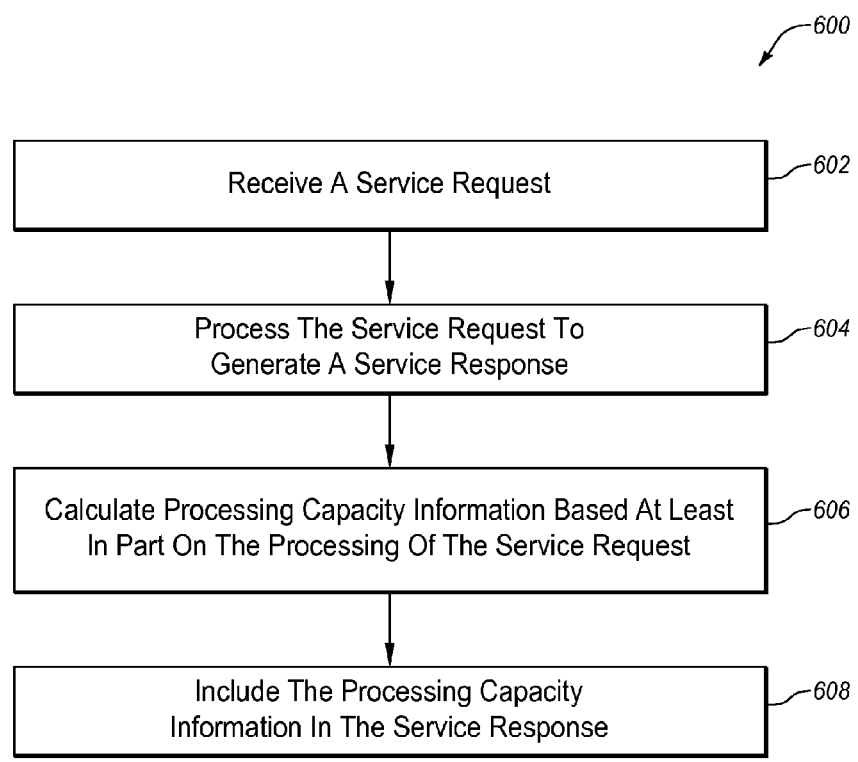
FIG. 6 illustrates an example flow diagram of a method that may be implemented in the example cloud computing system of FIG. 5.

FIG. 6 shows an example flow diagram of a method 600 that may be implemented in the example cloud computing system 500 of FIG. 5, arranged in accordance with at least some embodiments described herein. The method 600 may include various operations, functions, or actions as illustrated by one or more of blocks 602, 604, 606, and/or 608. The method 600 may begin at block 602.

In block 602 [Receive A Service Request], a service request may be received. The service request may be received by a cloud computing system, such as the cloud computing system 500 of FIG. 5. The service request may be received from a computing device over a network, such as a wireless network. The service request may indicate data and/or data processing requested by the computing device. In some embodiments, the service request may be an application programming interface call. Block 602 may be followed by block 604.

In block 604 [Process The Service Request To Generate A Service Response], the service request may be processed to generate a service response. The service response may include data fulfilling the service request. The service response may be sent back to the computing device in response to the service request. Block 604 may be followed by block 606.

In block 606 [Calculate Processing Capacity Information Based At Least In Part On The Processing Of The Service Request], processing capacity information may be calculated based at least in part on the processing of the service request. The processing capacity information may be calculated based on one or more of an average time for the cloud computing system to generate service responses, usage of a network over which the cloud computing system communicates, processing power usage of the cloud computing system, data storage usage of the cloud computing system, and a frequency of reception of service requests by the cloud computing system. In some embodiments, the processing capacity information may include an indication of an ability of the cloud computing system to reply to a future service request from the computing device. Alternately or additionally, the processing capacity information may include a wait time interval indicating a time for the computing device to wait between sending future service requests to the cloud computing system. Block 606 may be followed by block 608.

In block 608 [Include The Processing Capacity Information In The Service Response], the processing capacity information may be included in the service response. In some embodiments, including the processing capacity information in the service response may include embedding the processing capacity information in a hypertext transfer protocol header, an extensible markup language message comment, a java script object notation comment of the service response, or in some other field holding other content for the service response.

The outlined steps and operations of FIG. 6 are only provided as examples, and some of the steps and operations may be optional, may be combined into fewer steps and operations, or expanded into additional steps and operations.

For example, the method 600 may further include sending the service response to the computing device that generated the service request that resulted in the service response.

An example of method 600 is as follows, a cloud computing system may include an email cloud computing system that handles email services for mobile devices. The email cloud computing system may receive a service request from a computing device such as a smart phone. The service request may be an API call that requests the email cloud computing system to send an indication regarding whether an inbox of an email account has new emails. The email cloud computing system may generate a service response to the API call in the form of an API return that indicates if the inbox has new emails. The cloud computing system may also generate processing capacity information in the form of a wait time interval. The wait time interval may indicate a time for the smart phone to wait before sending more API calls to the email cloud computing system. The wait time interval may be determined based on the number of other smart phones and other devices accessing the email cloud computing system. The email cloud computing system may include the wait time interval in a comments section of the API return and may send the API return to the smart phone.

Figure 7:
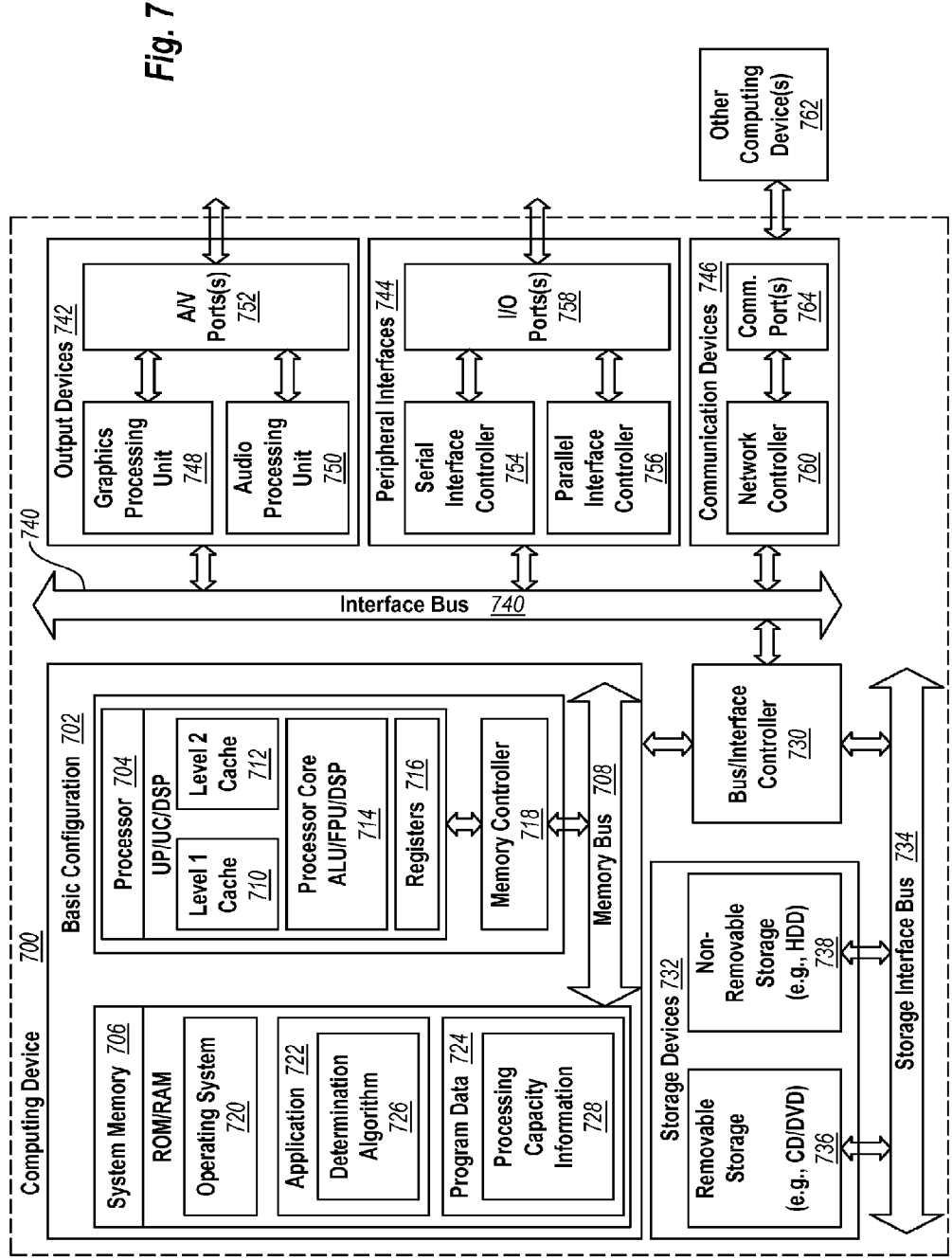
FIG. 7 is a block diagram illustrating an example computing device that is arranged for managing service requests, all arranged in accordance with at least some embodiments described herein.

FIG. 7 is a block diagram illustrating an example computing device 700 that is arranged for managing service requests, in accordance with at least some embodiments described herein. The computing device 700 may be included in any one of the computing devices 120, 220, 300 and/or the cloud computing systems 130, 140, 230, 240, 500 described herein, and/or the computing device 700 may include any one or more of the cloud communication unit 310, the information extraction unit 320, the process management unit 330, the processing unit 340, the device communication unit 510, the capacity calculation unit 520, the service request fulfillment unit 530, and/or the information embedding unit 550 described herein. In a very basic configuration 702, the computing device 700 typically includes one or more processors 704 and a system memory 706. A memory bus 708 may be used for communicating between the processor 704 and the system memory 706.

Depending on the desired configuration, the processor 704 may be of any type including but not limited to a microprocessor (μP), a microcontroller (μC), a digital signal processor (DSP), or any combination thereof. The processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system (OS) 720, one or more applications 722, and program data 724. The application 722 may include a determination application 726 that may be configured to determine the execution priority of a process based at least in part on processing capacity information as described herein or other algorithms including those described with respect to the methods 400 and 600 of FIGS. 4 and 6. The application 722 may correspond to the process management unit 330 of FIG. 3, for example. The program data 724 may include processing capacity information 728 that may be useful for determining the execution priority of a process as is described herein. In some embodiments, the application 722 may be arranged to operate with the program data 724 on the OS 720 such that implementations of managing service requests to a cloud computing system such as described in the method 400 of FIG. 4 may be provided as described herein. This described basic configuration 702 is illustrated in FIG. 7 by those components within the inner dashed line.

The computing device 700 may have additional features or functionality, and additional interfaces to facilitate communications between the basic configuration 702 and any required devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A mobile computing device configured to communicate with a plurality of cloud computing systems, the mobile computing device comprising:

a hardware processor configured to execute instructions in communication with a memory that stores the instructions to:

receive, via a transceiver, a first service response from a first cloud computing system in response to a first service request generated by a first process being executed on the mobile computing device, wherein the first service request is made via an application programming interface (API) call on the mobile computing device, and wherein the first service response is made via an API call on the first cloud computing system;

extract first processing capacity information of the first cloud computing system from the received first service response;

determine a first wait time interval for the mobile computing device to wait before at least generation of a first future service request that is to be sent to the first cloud computing system based at least, in part, on the extracted first processing capacity information of the first cloud computing system, wherein the extracted first processing capacity information comprises an indication of an ability of the first cloud computing system to respond to the first future service request;

receive, via the transceiver, a second service response from a second cloud computing system in response to a second service request from a second process being executed on the mobile computing device, wherein the second service request is made via an API call on the mobile computing device, and wherein the second service response is made via an API call on the second cloud computing system;

extract second processing capacity information of the second cloud computing system from the received second service response;

determine a second wait time interval for the mobile computing device to wait before at least generation of a second future service request that is to be sent to the second cloud computing system based at least, in part, on the extracted second processing capacity information of the second cloud computing system, wherein the second wait time interval is shorter than the first wait time interval;

delay execution of the first process by the first wait time interval;

delay execution of the second process by the second wait time interval;

execute the second process, after the second wait time interval, to generate the second future service request that is to be sent to the second cloud computing system from the mobile computing device, wherein the second process is executed prior to execution of the first process; and execute the first process, after the first wait time interval, to generate the first future service request that is to be sent to the first cloud computing system from the mobile computing device, wherein the execution of the first process and the second process based on the first time interval and the second time interval, respectively, enables maintenance of processing performance of the mobile computing device.

2. The mobile computing device of claim 1, wherein each of the first process and the second process comprises an application being executed on the mobile computing device.

3. The mobile computing device of claim 1, wherein the mobile computing device is further configured to wirelessly receive at least one of the first service response and the second service response from the first cloud computing system and/or the second cloud computing system over a wireless network.

4. The mobile computing device of claim 1, wherein at least one of the first cloud computing system and the second cloud computing system comprises a server configured to provide data to the mobile computing device based on the first service request and/or the second service request.

5. The mobile computing device of claim 1, wherein the mobile computing device comprises a mobile phone, a smart phone, a tablet computer, a laptop computer, or a gaming console.

6. A cloud computing system comprising:

a hardware processor configured to execute instructions in communication with a memory that stores the instructions to:

receive a first service request generated by a first process being executed on a mobile computing device and to send a first service response to the mobile computing device in response to the first service request, wherein the first service request is made via an application programming interface (API) call on the mobile computing device, wherein the first service response is made via an API call on the cloud computing system, and wherein the cloud computing system is different from the mobile computing device;

receive a second service request generated by a second process and to send a second service response in response to the second service request, wherein the second service request is made via an API call on the mobile computing device, and wherein the second service response is made via an API call on the cloud computing system;

calculate processing capacity information of the cloud computing system based at least, in part, on a first processing of the first service request and a second processing of the second service request, wherein the processing capacity information comprises an indication of an ability of the cloud computing system to respond to a future service request; and embed the processing capacity information of the cloud computing system in the second service response sent to the mobile computing device in response to the second service request, wherein the processing capacity information is used by the mobile computing device to determine a wait time interval for the mobile computing device to wait before at least generation of the future service request that is to be sent to the cloud computing system, and wherein the determination of the wait time interval enables the mobile computing device to delay execution of the first process and the second process that result in the generation of the future service request, which leads to reduction in overloading of the cloud computing system with service requests.

7. The cloud computing system of claim 6, wherein the processing capacity information is embedded in a hypertext transfer protocol header, an extensible markup language message comment, or a Java script object notation comment of the second service response.

8. The cloud computing system of claim 6, wherein the hardware processor is further configured to execute the instructions in communication with the memory that stores the instructions to calculate the processing capacity information based on one or more of an average time for generating a plurality of service responses, usage of a network over which the cloud computing system communicates, processing power usage of the cloud computing system, data storage usage of the cloud computing system, and a frequency of reception of a plurality of service requests.

9. A method to manage service requests to a plurality of cloud computing systems, the method comprising:

receiving, by a mobile computing device, a first service response from a first cloud computing system in response to a first service request generated by a first process being executed on the mobile computing device, wherein the first service request is made via an application programming interface (API) call on the mobile computing device, and wherein the first service response is made via an API call on the first cloud computing system;

extracting, by the mobile computing device, first processing capacity information of the first cloud computing system from the first service response that is received from the first cloud computing system;

determining, by the mobile computing device, a first wait time interval for the mobile computing device to wait before at least generating a first future service request that is to be sent to the first cloud computing system based at least, in part, on the extracted first processing capacity information of the first cloud computing system, wherein the extracted first processing capacity information comprises an indication of an ability of the first cloud computing system to respond to the first future service request;

receiving, by the mobile computing device, a second service response from a second cloud computing system in response to a second service request generated by a second process being executed on the mobile computing device, wherein the second service request is made via an API call on the mobile computing device, and wherein the second service response is made via an API call on the second cloud computing system;

extracting, by the mobile computing device, second processing capacity information of the second cloud computing system from the received second service response;

determining, by the mobile computing device, a second wait time interval for the mobile computing device to wait before at least generating a second future service request that is to be sent to the second cloud computing system based at least, in part, on the extracted second processing capacity information of the second cloud computing system, wherein the second wait time interval is shorter than the first wait time interval;

delaying, by the mobile computing device, execution of the first process by the first wait time interval;

delaying, by the mobile computing device, execution of the second process by the second wait time interval;

executing, by the mobile computing device, the second process, after the second wait time interval, to generate the second future service request that is to be sent to the second cloud computing system from the mobile computing device, wherein the second process is executed prior to execution of the first process; and executing, by the mobile computing device, the first process, after the first wait time interval, to generate the first future service request that is to be sent to the first cloud computing system from the mobile computing device, wherein the execution of the first process and the second process based on the first time interval and the second time interval, respectively, enables maintenance of processing performance of the mobile computing device.

10. A method to service service requests through a cloud computing system, the method comprising:

receiving a first service request generated by a first process being executed on a mobile computing device;

processing the first service request to generate a first service response, wherein the first service request is made via an application programming interface (API) call on the mobile computing device, and wherein the first service response is made via an API call on the cloud computing system;

receiving a second service request generated by a second process being executed on the mobile computing device;

processing the second service request to generate a second service response, wherein the second service request is made via an API call on the mobile computing device, and wherein the second service response is made via an API call on the cloud computing system;

calculating processing capacity information of the cloud computing system based at least, in part, on the processing of the first service request and the processing of the second service request; and embedding the processing capacity information in the second service response sent by the cloud computing system to the mobile computing device in response to the second service request, wherein the processing capacity information is used by the mobile computing device to determine a wait time interval for the mobile computing device to wait before at least generating a future service request that is to be sent to the cloud computing system, wherein the processing capacity information comprises an indication of an ability of the cloud computing system to respond to the future service request, and wherein the determination of the wait time interval enables the mobile computing device to delay execution of the first process and the second process that result in the generation of the future service request, which leads to reduction in overloading of the cloud computing system with service requests.

11. The method of claim 10, wherein embedding the processing capacity information in the second service response comprises embedding the processing capacity information in a hypertext transfer protocol header, an extensible markup language message comment, or a java script object notation comment of the second service response.

12. The method of claim 10, wherein calculating the processing capacity information of the cloud computing system comprises calculating processing capacity information based on one or more of an average time for generating a plurality of service responses, usage of a network over which the cloud computing system communicates, processing power usage of the cloud computing system, data storage usage of the cloud computing system, and a frequency of reception of a plurality of service requests.

13. The mobile computing device of claim 1, wherein the first future service request is generated by the first process that is being executed on the mobile computing device and that generated the first service request to the first cloud computing system, or the first future service request is generated by another process being executed on the mobile computing device other than the first process, and wherein the second future service request is generated by the second process that is being executed on the mobile computing device and that generated the second service request to the second cloud computing system, or the second future service request is generated by another process being executed on the mobile computing device other than the second process.

14. The cloud computing system of claim 6, wherein the future service request is generated by the first process or the second process that is being executed on the mobile computing device.

* * * * *